Sept. 14, 1943.   G. HETTINGER   2,329,536
ELECTRICAL VAPORIZER
Filed Jan. 10, 1939   2 Sheets-Sheet 1
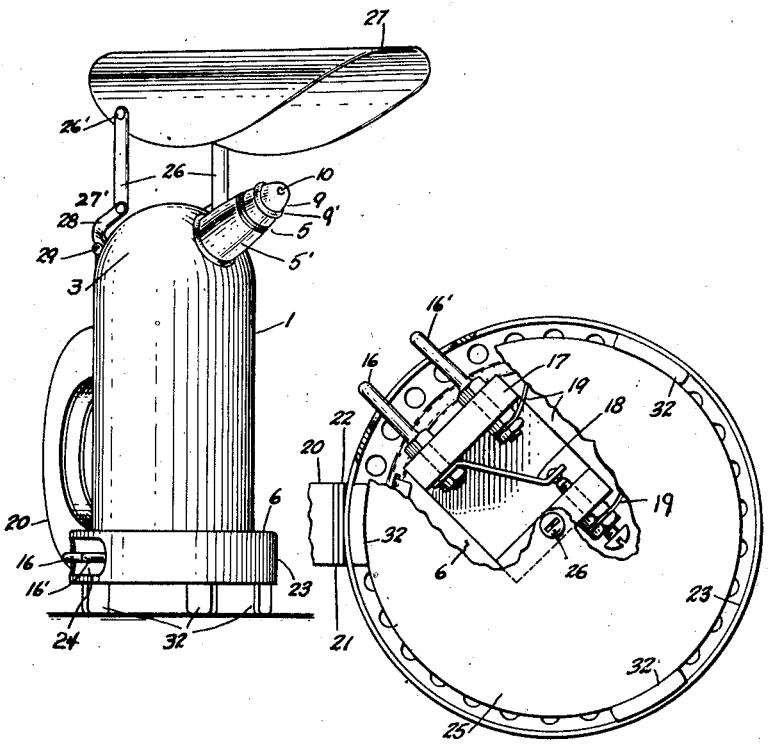
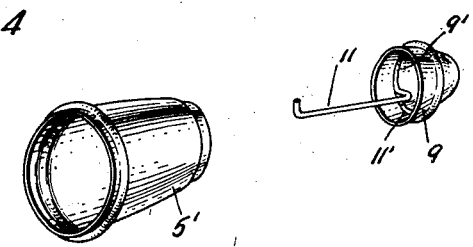
INVENTOR
GEORGE HETTINGER,
BY
Herbert H. Thompson
his ATTORNEY.

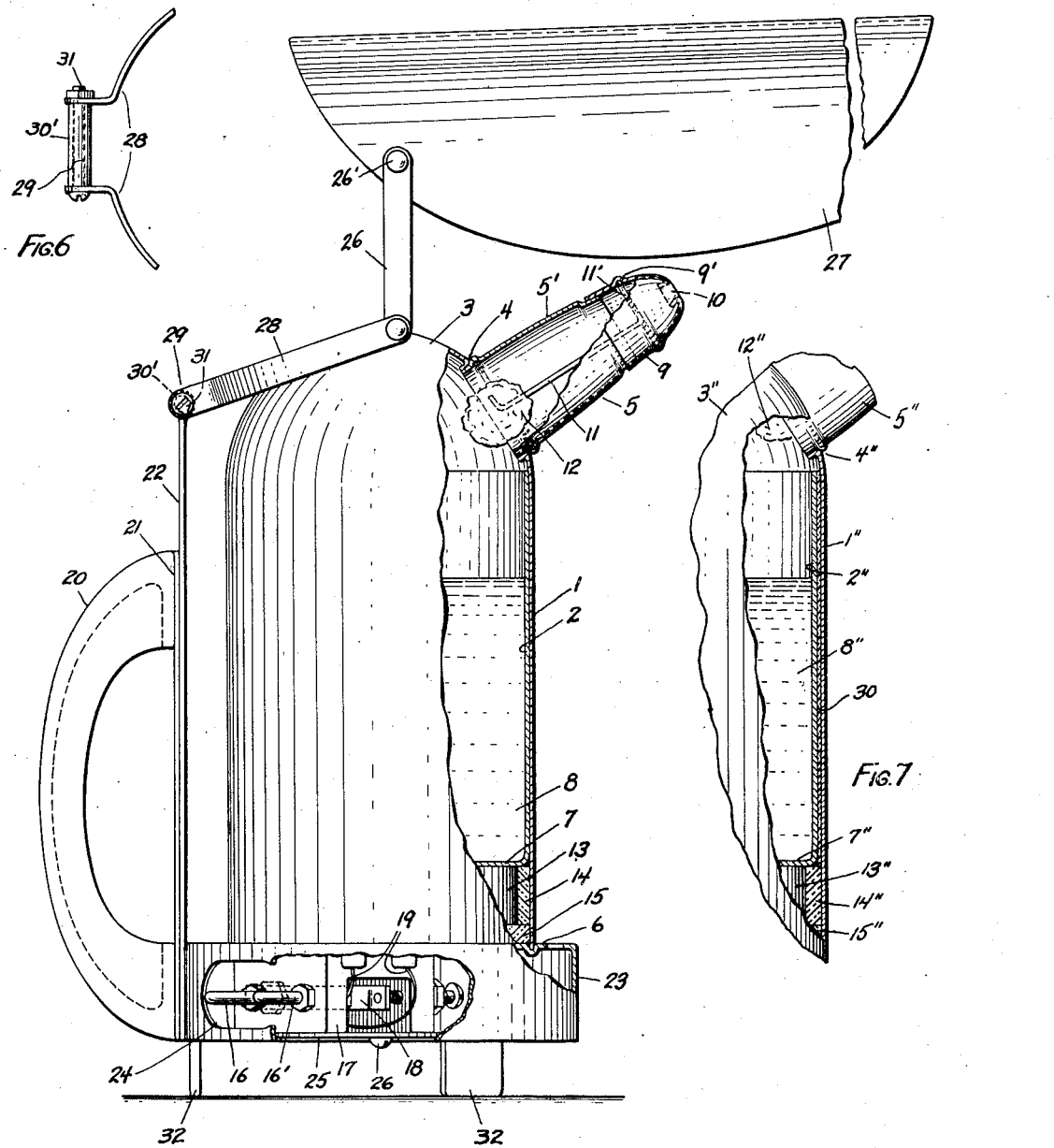

Patented Sept. 14, 1943

2,329,536

UNITED STATES PATENT OFFICE 2,329,536

ELECTRICAL VAPORIZER

George Hettinger, East Rutherford, N. J., assignor to American Sundries Company, Inc., Brooklyn, N. Y., a corporation Application January 10, 1939, Serial No. 250,110

2 Claims. (Cl. 21—119)

This invention relates to steam inhalators or vaporizers commonly used for the treatment of diseases and irritations of the respiratory tract, especially of children, such as croup, bronchitis, laryngitis and severe head colds.

More particularly, the invention relates to the type in which the medication is preferably not placed in the water in the container, but is placed in the path of the escaping steam as by being placed upon absorbent material above the water level.

One object of the invention is to improve this type of vaporizer by strengthening and simplifying the construction.

A further object of this invention is to provide the same with a steam directing shield.

Another object of the invention is to provide the same with an improved thermostatic cut-out to prevent damage to the container parts and heating element in case the container boils dry.

Further objects of the invention will become apparent from the following description.

Referring to the drawings showing a preferred form of my invention,

Fig. 1 is a perspective view of my improved electric vaporizer.

Fig. 2 is a side elevation partly in section of the same on a larger scale.

Fig. 3 is a detail in perspective of the separate nozzle for the steam, showing the hook for the absorbent material on which the medicine is placed.

Fig. 4 is a perspective view of the second portion of the steam spout.

Fig. 5 is a bottom plan view of the combined electric terminal and thermostat block.

Fig. 6 is a plan view of the main hinge pivotally supporting the steam hood or shield.

Fig. 7 is a sectional detail of a wall of the container, showing a modified construction.

The main body portion of my container is preferably formed of two telescopic or inter-fitting cylinders 1 and 2, of sheet metal or the like. The outer cylinder 1 is shown as longer than the inner cylinder 2 and at the top is formed in the shape of a dome 3 which is closed except for a round opening 4 therein to receive the detachable spout 5 and to act as the filling opening. The outer member 1 also is secured at its bottom to the base member 6, also preferably formed of sheet metal, by crimping or otherwise. The inner member 2 is open at the top and has a closed bottom 7 and is adapted to contain the water 8 or other liquid to be vaporized. The outer member may be said to be inverted, since the closed bottom is placed on top. If desired, insulation 30 may be placed between the walls of the two containers or receptacles so as to keep the outer wall cool, as shown in Fig. 7.

The spout 5 is shown as made in two pieces, a bottom piece 5' and a top piece 9 which has therein the steam nozzle or opening 10. The two pieces have a sliding or telescopic fit as shown in Fig. 2 so that the nozzle member may be readily removed from the bottom member 5'. Within the nozzle or cap member is shown a bent wire 11 on the outer end of which a piece of cotton or gauze 12 may be caught which is impregnated with the medicine such as tincture of benzoin. The other end of the wire is preferably coiled in a single spring coil 11' which is sprung within annular channel 9' within the cap 9. The bottom portion 5' may also be detachable from the dome 3 so that both parts may be removed for filling the container, although if desired, only the top portion 9 may be removed for this purpose.

Between the bottom 7 and the top of the base 6 is placed the electrical heating element 13 which may be of any standard hot wire type. Insulation 14 and 15 is preferably placed between the heating element and the outer wall 1 and between the heating element and the base 6 so as to confine the heat to the water in the container. Projecting from the base is shown two prongs or electrical terminals 16, 16' for engagement with any standard electric plug such as used on electric ironing cords and the like. Said prongs are preferably secured to the same insulating block 17 within which I mount a thermostatic switch 18 in circuit with one or both of the wires 19 leading to the heating element 13. Block 17 is clamped firmly against the under surface of plate 6 so as to receive some of the heat escaping from the heating element. Said switch is adjusted so that it will remain closed during all ordinary vaporizing operations but will open in case the heat rises much beyond such limits due, for instance, to the fact that the container 2 had boiled dry. By incorporating the thermostatic switch within and as a part of the block carrying the terminals 16 and 16', a simplification of prior constructions is achieved, and the cost of manufacture reduced.

For convenient handling of the container is shown a spaced handle 20 preferably made hollow and of insulating material. The handle is shown as in the shape of an arc which is secured at both ends to a flat insulating plate 21. Said plate is clamped to the vertical bar 22 which may be of metal and which is secured preferably at the base only, to the downwardly turned rim 23 of the base 6. By securing the bar 22 only at its bottom, the handle remains cool at all times. It will be noted that said rim encloses on all sides, the thermostatic switch block 17 except for the elliptical opening 24 for the connecting electric plug. For further protection, a thin metal plate 25 may be secured to the bottom of said block as by means of set screw 26. When the block is in place therefore, no live wires or parts are exposed to the touch.

Said bar 22 also serves to support the steam hood 27. Said hood is shown as pivoted at both sides 26' to a pair of links 26, said links in turn being pivoted at 27' to a pair of curved links or arms 28, together forming a U-shaped bracket pivoted at 29 to the bar at 22. Preferably each of said pairs of pivots 26', 27' and 29 is sufficiently tight to hold the shield in any position that it is adjusted about any pivotal axis. Pivot 29 is shown as provided by turning over the top of the bar 22 to form a sleeve 30' through which extends a set screw 31 which clamps the two arms 29 against the sleeve, holding it in frictional engagement therewith. Suitable feet 32, preferably of insulated material, are shown as secured within rim 23 of base 6 for supporting the base 6 to keep it spaced from the furniture on which the device is placed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an electric vaporizer, a tubular cover member having a dome-shaped top portion integral therewith in which an opening is provided, a vaporizing fluid container of closed bottom end tubular form telescopically fitting within said cover, a circular base to which the cover member is attached and of greater diameter than the tubular cover member, an electric heating element enclosed by said cover member and situated between the base for the cover member and the bottom end of the vaporizing fluid container, a nozzle element fitting in the provided opening in the dome-shaped portion of the cover member, and a handle secured to said base and extending outwardly therefrom in spaced parallel relation to said cover member.

2. In an electric vaporizer, a tubular cover member having a dome-shaped top portion integral therewith in which an opening is provided, a vaporizing fluid container of closed bottom end tubular form telescopically fitting within said cover, a circular base to which the cover member is attached and of greater diameter than the tubular cover member, an electric heating element enclosed by said cover member and situated between the base for the cover member and the bottom end of the vaporizing fluid container, a nozzle element fitting in the provided opening in the dome-shaped portion of the cover member, a handle secured to said base and extending outwardly therefrom in spaced parallel relation to said cover member, and a steam deflecting dome adjustably fixed to the upper part of said handle.

GEORGE HETTINGER.